Patented May 25, 1937

2,081,889

UNITED STATES PATENT OFFICE 2,081,889

NONCRYSTALLIZING ROSIN COMPOSITION AND METHOD OF PRODUCING

Joseph N. Borglin, Wilmington, Del., assignor to Hercules Powder Company, Wilmington, Del., a corporation of Delaware No Drawing. Application October 7, 1933, Serial No. 692,704

10 Claims. (Cl. 106—22)

My invention relates to a non-crystallizing rosin composition and to a method of producing the same.

It is well known that certain types of rosin, especially wood rosin, although amorphous in character when first produced, tend to crystallize upon standing. When such rosins are included in various compositions, for example, in core oils used in foundries for preparing moulds, in printers' inks, in paper sizes, and the like, the rosin may crystallize and hence greatly impair the quality of the composition.

Now, I have found that by the addition of relatively small quantities of synthetic resins to such rosin compositions, I can eliminate or greatly reduce the tendency of the rosin to crystallize. I prefer to use for this purpose synthetic resins having a high molecular weight, that is to say, a molecular weight above 200, as, for example, the various polyhydric alcohol-polybasic acid resins, terpinene-maleic anhydride resin, terpinolene-maleic anhydride resin, dipentene-maleic anhydride resin, pinene-maleic anhydride resin, abietic acid-maleic anhydride resin, methyl abietate-maleic anhydride resin, or the like. The polyhydric alcohol-polybasic acid resins employed may be either of the so-called "simple" type, or they may be modified with various known modifying agents such as drying oils, fatty acids, resin acids, or the like. Mixtures of the various resins may be employed if desired.

The various terpene-maleic anhydride resins as terpinene-maleic anhydride resin, terpinolene-maleic anhydride resin, dipentene-maleic anhydride resin, pinene-maleic anhydride resin, or the like, may be prepared by heating the respective terpenes with maleic anhydride, as, for example, is more fully disclosed in the application for United States Patent of Ernest G. Peterson and Edgar R. Littmann, Ser. No. 496,560, filed November 18, 1930 now Patent 1,993,025, and of Ernest G. Peterson, Serial No. 683,627, filed August 4, 1933 now Patent 1,993,031.

I prefer to incorporate these synthetic resins into any given rosin composition by first thoroughly blending the rosin with the synthetic resin to be used and then forming the composition from the rosin so treated in the usual manner for its formation. However, I may add the synthetic resin to be used along with other ingredients of the rosin composition without first blending the rosin and the synthetic resin. The synthetic resin will desirably be used in amount less than 49% of the weight of rosin in a composition, the amount used in any given case depending upon the type of resin employed and upon the nature of the composition in which the rosin is to be utilized. Variously, resin in amount within about the range 0.01–35% of the weight of rosin will be found satisfactory, depending upon the use for which any given composition is intended. Again, not exceeding about 25% of resin will be sufficient. As an example, in the manufacture of a core oil it is desirable to use from 0.25% to 1% of synthetic resin based on the amount of rosin employed.

As illustrative of the practical embodiment of my invention, I may prepare a core oil unusually resistant to crystallization by combining 40 parts of FF wood rosin, 30 parts of linseed oil, 30 parts of kerosene, and 1 part of terpinene-maleic anhydride. The core oil so produced will be free from crystals after standing for 44 days, while a similar core oil containing no terpinene-maleic anhydride whatever will crystallize in about 7 days.

In place of the terpinene-maleic anhydride in the above example, I may use, for example, terpinolene-maleic anhydride resin, dipentene-maleic anhydride resin, pinene-maleic anhydride resin, or the like, or I may use a simple polyhydric alcohol-polybasic acid resin such as a glycol-phthalic anhydride resin, or a modified polyhydric alcohol-polybasic acid resin such as a glycerol-phthalic anhydride-rosin resin, glycerol-phthalic anhydride stearic acid resin, glycerol-phthalic anhydride-perilla oil resin, or glycerol-phthalic anhydride-linoleic acid resin. Some of these resins may not be completely soluble in the constituents of the rosin composition but they will be sufficiently soluble therein to effectively inhibit crystallization and any insoluble portion may be removed from the composition if desired by filtration or centrifuging. In place of synthetic resins made from phthalic anhydrides, I may, of course, use synthetic resins made from any other polybasic organic acid.

As further illustrative of the practical adaptation of my invention, I may produce a non-crystallizing rosin composition by heating rosin with from 0.01 to 49% of any of the synthetic resins described above until they are completely blended together. This rosin so treated is substantially non-crystallizing and may then be employed as such, or in the usual manner in the manufacture of various compositions such as core oils, printing inks, paper sizes, and the like, to produce a non-crystallizing material. I prefer to employ this procedure rather than to merely include the synthetic resin along with the other ingredients of the rosin composition as in the first example given above, since a more intimate mixing with the rosin is obtained and accordingly a more effective prevention of crystallization.

It will be apparent that the product in accordance with my invention involves broadly a composition containing rosin and a relatively small amount of synthetic resin, preferably of high molecular weight, in intimate admixture, with or without other ingredients and that the method in accordance with this invention involves broadly the formation of such a mixture of rosin and synthetic resin by blending the rosin and synthetic resin with or without the presence or addition of other ingredients.

The compositions in accordance with my invention will be found to be superior to other rosin compositions in that they are greatly more resistant to crystallization but are otherwise substantially identical with untreated compositions, since the small amount of synthetic resin employed will not alter other properties of the composition.

What I claim and desire to protect by Letters Patent is:

1. A substantially non-crystallizing rosin product comprising a normally crystallizable rosin containing in intimate physical admixture a synthetic resin in amount of from about 0.25% to about 1% by weight of the rosin.

2. A substantially non-crystallizing rosin product comprising a normally crystallizable rosin containing in intimate physical admixture a synthetic resin having a molecular weight of more than 200 in amount of from about 0.25% to about 1% by weight of the rosin.

3. A substantially non-crystallizing rosin product comprising a normally crystallizable rosin containing in intimate physical admixture a polyhydric alcohol-polybasic acid resin in amount of from about 0.25% to about 1% by weight of the rosin.

4. A substantially non-crystallizing rosin product comprising a normally crystallizable rosin containing in intimate physical admixture a terpene-maleic anhydride resin in amount of from about 0.25% to about 1% by weight of the rosin.

5. The method of making a substantially non-crystallizing rosin composition which includes intimately mixing a normally crystallizable rosin with a synthetic resin, the synthetic resin being present in amount of from about 0.25% to about 1% by weight of the rosin.

6. A substantially non-crystallizing rosin product substantially identical with a normal rosin except for a reduced tendency to crystallize, comprising a normally crystallizable rosin containing in intimate physical admixture a synthetic resin in amount sufficient to substantially prevent crystallization of a rosin acid from the rosin.

7. A substantially non-crystallizing rosin product substantially identical with a normal rosin except for a reduced tendency to crystallize, comprising a normally crystallizable rosin containing in intimate physical admixture a synthetic resin having a molecular weight of more than 200 in amount sufficient to substantially prevent crystallization of a rosin acid from the rosin.

8. A substantially non-crystallizing rosin product substantially identical with a normal rosin except for a reduced tendency to crystallize, comprising a normally crystallizable rosin containing in intimate physical admixture a polyhydric alcohol-polybasic acid resin in amount sufficient to substantially prevent crystallization of a rosin acid from the rosin.

9. A substantially non-crystallizing rosin product substantially identical with a normal rosin except for a reduced tendency to crystallize, comprising a normally crystallizable rosin containing in intimate physical admixture a terpene-maleic anhydride resin in amount sufficient to substantially prevent crystallization of a rosin acid from the rosin.

10. The method of making a substantially non-crystallizing rosin product which includes intimately mixing a synthetic resin with a normally crystallizable rosin, the synthetic resin being employed in amount sufficient to substantially prevent crystallization of a rosin acid from the rosin but insufficient to give to the rosin product properties otherwise substantially different from those of a normal rosin.

JOSEPH N. BORGLIN.

CERTIFICATE OF CORRECTION.

Patent No. 2,081,889.  May 25, 1937.

JOSEPH N. BORGLIN.

It is hereby certified that error appears in the printed specification of the above numbered patent requiring correction as follows: Page 1, second column, line 8, for "manufactlure" read manufacture; line 23, for "dipentine-maleic" read dipentene-maleic; and that the said Letters Patent should be read with these corrections therein that the same may conform to the record of the case in the Patent Office.

Signed and sealed this 20th day of July, A. D. 1937.

Henry Van Arsdale (Seal)  Acting Commissioner of Patents above, since a more intimate mixing with the rosin is obtained and accordingly a more effective prevention of crystallization.

It will be apparent that the product in accordance with my invention involves broadly a composition containing rosin and a relatively small amount of synthetic resin, preferably of high molecular weight, in intimate admixture, with or without other ingredients and that the method in accordance with this invention involves broadly the formation of such a mixture of rosin and synthetic resin by blending the rosin and synthetic resin with or without the presence or addition of other ingredients.

The compositions in accordance with my invention will be found to be superior to other rosin compositions in that they are greatly more resistant to crystallization but are otherwise substantially identical with untreated compositions, since the small amount of synthetic resin employed will not alter other properties of the composition.

What I claim and desire to protect by Letters Patent is:

1. A substantially non-crystallizing rosin product comprising a normally crystallizable rosin containing in intimate physical admixture a synthetic resin in amount of from about 0.25% to about 1% by weight of the rosin.

2. A substantially non-crystallizing rosin product comprising a normally crystallizable rosin containing in intimate physical admixture a synthetic resin having a molecular weight of more than 200 in amount of from about 0.25% to about 1% by weight of the rosin.

3. A substantially non-crystallizing rosin product comprising a normally crystallizable rosin containing in intimate physical admixture a polyhydric alcohol-polybasic acid resin in amount of from about 0.25% to about 1% by weight of the rosin.

4. A substantially non-crystallizing rosin product comprising a normally crystallizable rosin containing in intimate physical admixture a terpene-maleic anhydride resin in amount of from about 0.25% to about 1% by weight of the rosin.

5. The method of making a substantially non-crystallizing rosin composition which includes intimately mixing a normally crystallizable rosin with a synthetic resin, the synthetic resin being present in amount of from about 0.25% to about 1% by weight of the rosin.

6. A substantially non-crystallizing rosin product substantially identical with a normal rosin except for a reduced tendency to crystallize, comprising a normally crystallizable rosin containing in intimate physical admixture a synthetic resin in amount sufficient to substantially prevent crystallization of a rosin acid from the rosin.

7. A substantially non-crystallizing rosin product substantially identical with a normal rosin except for a reduced tendency to crystallize, comprising a normally crystallizable rosin containing in intimate physical admixture a synthetic resin having a molecular weight of more than 200 in amount sufficient to substantially prevent crystallization of a rosin acid from the rosin.

8. A substantially non-crystallizing rosin product substantially identical with a normal rosin except for a reduced tendency to crystallize, comprising a normally crystallizable rosin containing in intimate physical admixture a polyhydric alcohol-polybasic acid resin in amount sufficient to substantially prevent crystallization of a rosin acid from the rosin.

9. A substantially non-crystallizing rosin product substantially identical with a normal rosin except for a reduced tendency to crystallize, comprising a normally crystallizable rosin containing in intimate physical admixture a terpene-maleic anhydride resin in amount sufficient to substantially prevent crystallization of a rosin acid from the rosin.

10. The method of making a substantially non-crystallizing rosin product which includes intimately mixing a synthetic resin with a normally crystallizable rosin, the synthetic resin being employed in amount sufficient to substantially prevent crystallization of a rosin acid from the rosin but insufficient to give to the rosin product properties otherwise substantially different from those of a normal rosin.

JOSEPH N. BORGLIN.

CERTIFICATE OF CORRECTION.

Patent No. 2,081,889.

May 25, 1937.

JOSEPH N. BORGLIN.

It is hereby certified that error appears in the printed specification of the above numbered patent requiring correction as follows: Page 1, second column, line 8, for "manufactlure" read manufacture; line 23, for "dipentine-maleic" read dipentene-maleic; and that the said Letters Patent should be read with these corrections therein that the same may conform to the record of the case in the Patent Office.

Signed and sealed this 20th day of July, A. D. 1937.

Henry Van Arsdale (Seal)

Acting Commissioner of Patents

CERTIFICATE OF CORRECTION.

Patent No. 2,081,889.                                                           May 25, 1937.

JOSEPH N. BORGLIN.

It is hereby certified that error appears in the printed specification of the above numbered patent requiring correction as follows: Page 1, second column, line 8, for "manufactlure" read manufacture; line 23, for "dipentine-maleic" read dipentene-maleic; and that the said Letters Patent should be read with these corrections therein that the same may conform to the record of the case in the Patent Office.

Signed and sealed this 20th day of July, A. D. 1937.

Henry Van Arsdale (Seal)                                  Acting Commissioner of Patents